US006984921B1

(12) United States Patent
Kosterman

(10) Patent No.: US 6,984,921 B1
(45) Date of Patent: Jan. 10, 2006

(54) APPARATUS AND METHOD FOR RESONANT MOUNTING OF VIBRATION STRUCTURE

(75) Inventor: James A. Kosterman, Sycamore, IL (US)

(73) Assignee: Dukane Corporation, St. Charles, IL (US)

(*) Notice: Subject to any disclaimer, the term of this patent is extended or adjusted under 35 U.S.C. 154(b) by 45 days.

(21) Appl. No.: 10/372,620

(22) Filed: Feb. 21, 2003

(51) Int. Cl.
*H02N 2/00* (2006.01)

(52) U.S. Cl. .................. 310/323.19; 310/348; 248/638

(58) Field of Classification Search ........... 310/323.19, 310/348, 345; 248/638, 568
See application file for complete search history.

(56) References Cited

U.S. PATENT DOCUMENTS 2,632,858 A 3/1953 Calosi
2,866,911 A 12/1958 Rawding
2,883,132 A * 4/1959 Neher ........................ 248/563
3,037,734 A * 6/1962 Coyle ......................... 267/134
3,721,411 A * 3/1973 Cunningham ............... 248/606
5,590,866 A * 1/1997 Cunningham ............... 310/345

FOREIGN PATENT DOCUMENTS

WO WO 00/47013 * 8/2000

* cited by examiner

*Primary Examiner*—Thomas M. Dougherty
(74) *Attorney, Agent, or Firm*—Seyfarth Shaw LLP

(57) ABSTRACT

A mount for a vibration structure includes a ring having a flexural portion defining an arcuate mounting surface terminating at a free distal end and secured to an arcuate bearing surface on a flange of the vibration structure in coaxial bearing engagement therewith, the flexural portion having a radial stop surface spaced from the distal end and contacting an end surface of the vibration structure flange. Attachment structure on the mounting ring is adapted for attachment to an associated support. The flexural portion is resonant at the resonant frequency of the vibration structure and is shaped and dimensioned for flexing sufficient to accommodate movement of the bearing surface at resonance.

30 Claims, 6 Drawing Sheets

APPARATUS AND METHOD FOR RESONANT MOUNTING OF VIBRATION STRUCTURE

BACKGROUND

This application relates to mounting techniques for supporting vibratory elements from a non-vibratory support platform. The application relates in particular to techniques for supporting vibration structures which vibrate at sonic or ultrasonic frequencies, such as transducers, horns, boosters, and the like.

Such vibration structures typically undergo axial vibrations and include a series of half-wavelength sections with each section typically having a low (axial amplitude) nodal area and two high (axial) amplitude antinodal areas. Various types of mounting arrangements for supporting such vibration structures on a rigid support structure while substantially isolating the support structure from the vibrations have heretofore been utilized.

One prior mounting arrangement employs elastomeric O-rings Typically, a set of annular metal rings are used to respectively clamp O-rings against opposite sides of a mounting flange disposed on the vibration structure substantially at a nodal region. The clamping rings can be rigidly attached to a substantially rigid support structure, while minimizing the vibratory energy transmitted from the vibrating structure to the rigid structure. This vibration isolation is due to the absorbing and dampening properties of the elastomeric O-rings. The clamping of an annular nodal flange on a vibratory ultrasonic device from both sides of the flange has long been practiced.

However, the O-rings are subjected to wear and, in some applications, the use of an elastomeric O-ring reduces the ability to repeatedly position the vibration structure, due to the compliant nature of the rings. In order to provide enhanced stiffness or rigidity to the mount, metallic nodal mounts have been utilized. One such mount is disclosed in U.S. Pat. No. 5,590,866, which utilizes a pair of cylindrical flexural tubes, respectively bearing against opposite sides of the mounting flange on the vibration structure, and clamping means for clamping the tubes axially together and tightly against the opposite sides of the mounting flange.

U.S. Pat. Nos. 2,632,858 and 2,866,911 disclose techniques for supporting a magnetostrictive vibratory device by means of an elongated resonant tube, one end of which is connected to the vibratory device's nodal region, as by a threaded coupling or by soldering.

SUMMARY

This application discloses improved techniques for supporting vibration structures on rigid supports which avoid the disadvantages of prior techniques while affording additional structural and operating advantages.

An aspect of the techniques disclosed is that they are characterized by economy and simplicity of construction and ease of application.

Another aspect is the provision of a mounting apparatus which is tuned to be resonant at the resonant frequency of the vibration structure being mounted.

Still another aspect is the provision of a mounting apparatus which need not be coupled to the vibration structure at a nodal region.

Certain ones of these and other aspects may be attained by providing apparatus for mounting an elongated vibration structure which has a longitudinal axis and which undergoes axial vibrations and has a natural resonant frequency, the structure having a flange with an arcuate bearing surface disposed at a predetermined radius from the axis and with a radial end surface at an end of the bearing surface, the apparatus comprising: a mounting ring having a flexural portion defining an arcuate mounting surface terminating at a free distal end and adapted to be secured to the bearing surface of an associated vibration structure flange in coaxial bearing engagement therewith so as to inhibit relative movement therebetween, the flexural portion having a radial stop surface spaced from the free distal end and disposed for contact with the end surface of the vibration structure flange, the mounting ring having attachment structure adapted for attachment to an associated support, the flexural portion being shaped and dimensioned to be resonant at the resonant frequency and for flexing sufficient to accommodate movement of the bearing surface in response to resonance of the vibration structure.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Referring to FIGS. 1–5, there is illustrated a vibratory system, generally designated by the numeral 10, which includes a vibration structure 11 and a mounting apparatus 25 for supporting the vibration structure on an associated support (not shown). In the illustrated embodiment, the vibratory system is one designed for operation at ultrasonic frequencies and the vibration structure 11 is an ultrasonic booster. However, it will be appreciated that the vibration structure could be an ultrasonic horn or transducer or other type of device and that the vibratory system 10 could be designed for operation at other frequency ranges.

Figure 1:
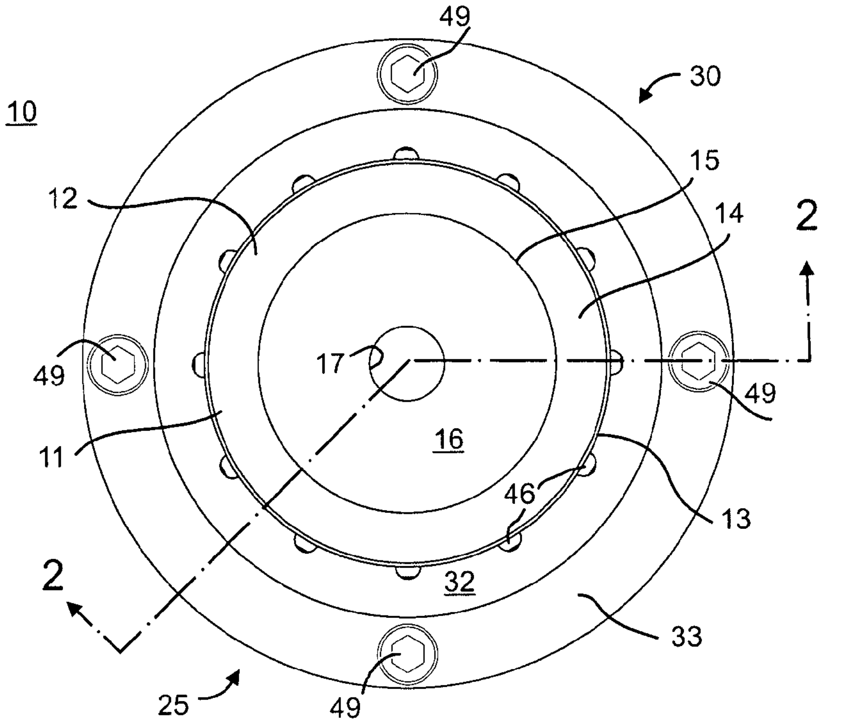
FIG. 1 is a top plan view of a vibratory system including an embodiment of mounting apparatus mounting an ultrasonic booster.
Figure 3:
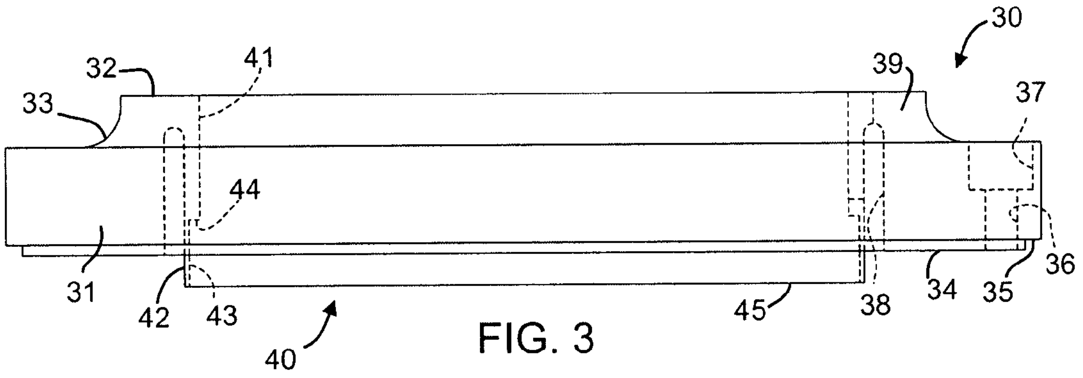
FIG. 3 is an enlarged side elevational view of the mounting ring of the mounting apparatus of FIG. 1.
Figure 4:
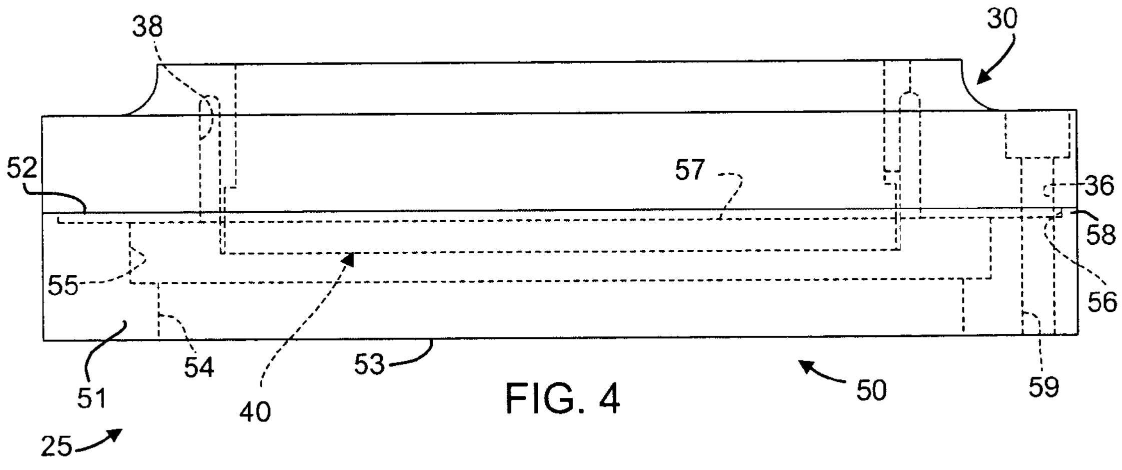
FIG. 4 is an enlarged side elevational view of the mounting apparatus of FIG. 1.
Figure 2:
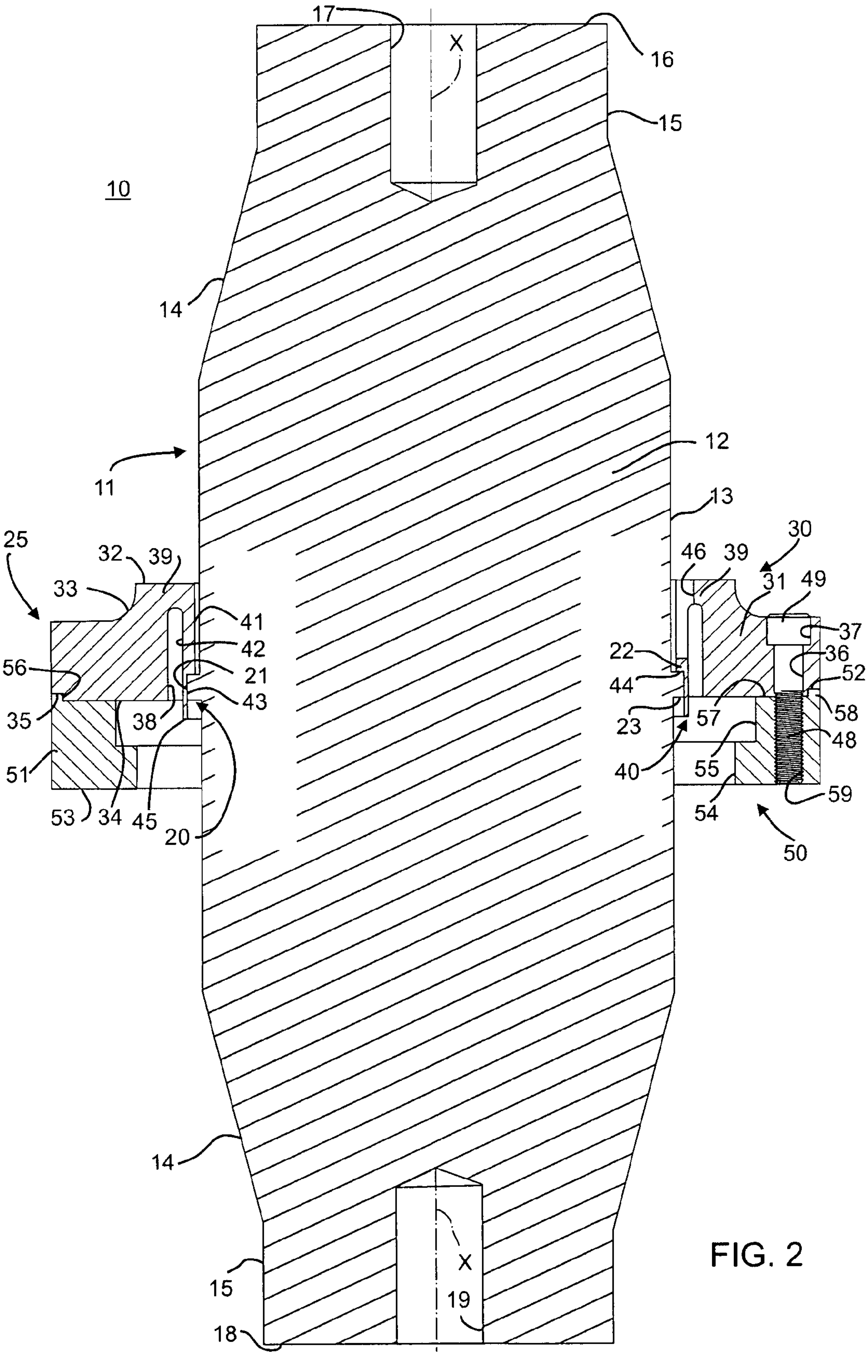
FIG. 2 is an enlarged sectional view taken generally along the line 2—2 in FIG. 1.
Figure 5:
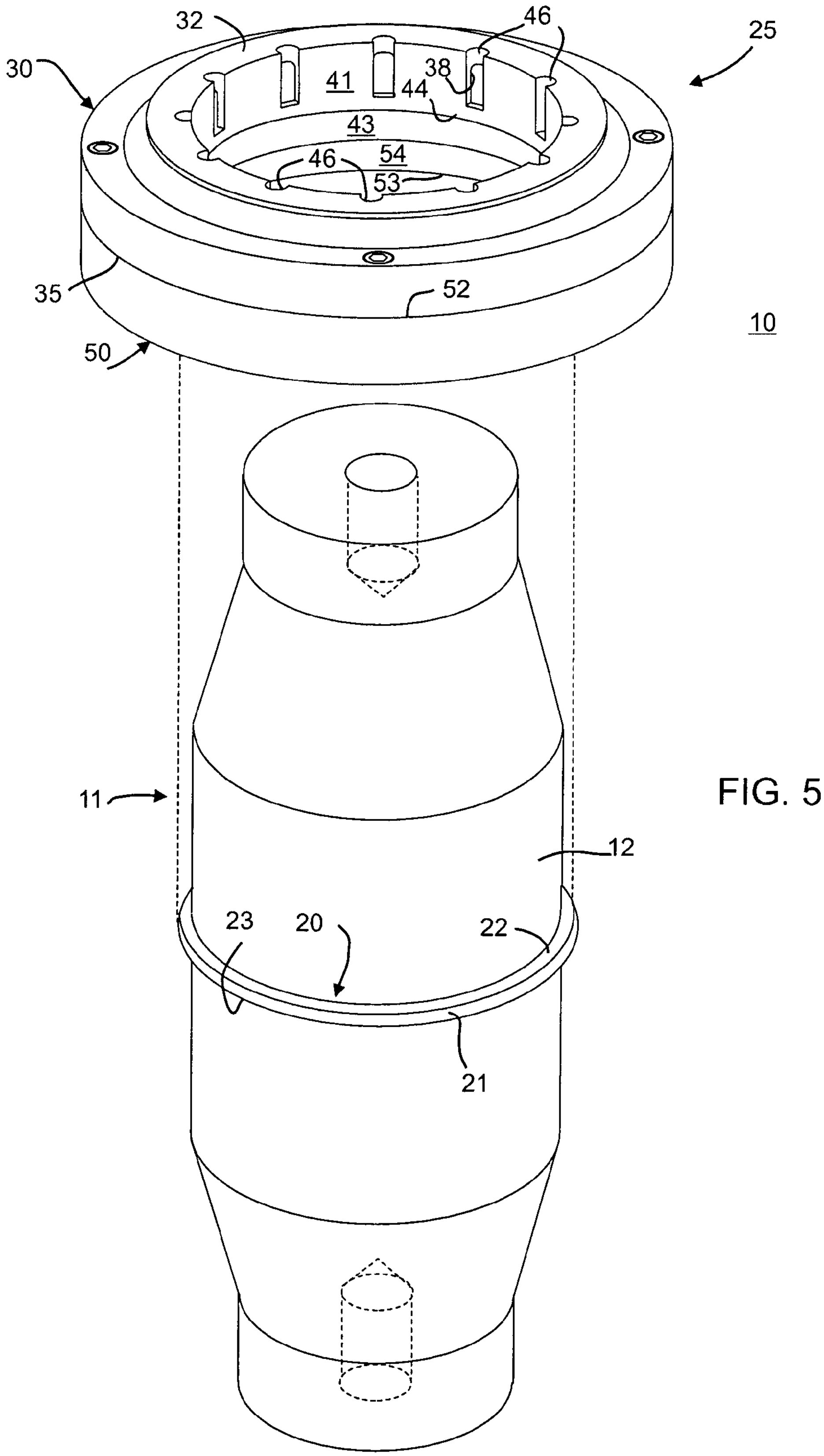
FIG. 5 is a perspective view of the vibratory system of FIG. 1, illustrating assembly of the mounting apparatus to the booster.

Referring in particular to FIGS. 1, 2 and 5, the vibration structure 11 has an elongated cylindrical body 12 having a longitudinal axis X. The mid portion of the body 12 has a relatively large-diameter outer cylindrical surface 13, joined at its opposite ends by tapered, generally frustoconical surfaces 14, to reduced-diameter cylindrical surfaces 15, respectively terminating at circular end surfaces 16 and 18. Respectively formed axially in the end surfaces 16 and 18 may be axial bores 17 and 19, which may be internally threaded to facilitate fastening or attachment to associated devices. The body 12 is provided, intermediate its ends, with a radially outwardly projecting mounting flange 20, which is substantially rectangular in transverse cross-section. The flange 20 has an outer cylindrical bearing surface 21 coaxial with the outer surface 13 and disposed at a predetermined radius from the axis X and terminating at annular end surfaces 22 and 23, which are respectively disposed in planes substantially parallel to each other and perpendicular to the axis X.

The mounting apparatus 25 includes a mounting ring 30 and a support ring 50. The mounting ring 30 has an annular body 31 having an annular top surface 32 substantially perpendicular to the central axis of the body 31, the top surface 32 having an arcuate, generally concave recess 33 around its outer perimeter. The body 31 has an annular bottom surface 34 substantially parallel to the top surface 32 and provided around its outer periphery with a shallow recess which defines a stepped shoulder 35. Formed through the body 31 substantially parallel to the central axis thereof are four equiangularly space-apart bores 36 extending between the recess 33 and the bottom surface 34, and each provided at its upper end with a counterbore 37. Formed in the bottom surface 34 is an annular channel 38 which extends upwardly to a level slightly above the bottom of the recess 33, the portion of the body 31 between the upper end of the channel 38 and the top surface 32 defining a bridge 39, which joins the main portion of the body 31 to a cantilevered flexural portion 40.

The flexural portion 40 has an inner cylindrical surface 41 which defines a central bore through the body 31, and an outer cylindrical surface 42 defined by the channel 38. The surface 41 has a diameter slightly greater than that of the outer surface 13 of the vibration structure 11. The lower end of the flexural portion 40 is counterbored to define a cylindrical mounting surface 43, coaxial with the outer cylindrical surface 42, and an annular stop surface 44. The mounting surface 43 has a diameter substantially the same as that of the bearing surface 21 of the vibration structure flange 20. The flexural portion 40 terminates at a distal end 45, which may extend downwardly below the bottom surface 34. Formed in the inner cylindrical surface 41 are a plurality of equiangularly-spaced apart recesses 46, which may be substantially semicylindrical in shape, each recess 46 extending axially from the top surface 32 to a slight distance above the stop surface 44, and having a radial depth extending substantially to the radial midpoint of the channel 38, as can best be seen in FIG. 2. (Terms such as "top" and "bottom" or "upper" and "lower" are used herein relative to the orientation of the parts as illustrated in the drawings. However, it will be appreciated that the parts need not be disposed in that orientation in use.)

The support ring 50 has an annular body 51 with an annular substantially planar top surface 52 disposed substantially perpendicular to the central axis of the body 51, and an annular bottom surface 53 substantially parallel to the top surface 52. Extending axially through the body 51 is a center bore defining a cylindrical inner surface 54. The top surface 52 is then counterbored to define an intermediate cylindrical surface 55 and is further counterbored to define an outer cylindrical surface 56 and an annular recessed top surface 57. The diameter of the cylindrical surface 56 is slightly less than the outer diameter of the body 51, cooperating with the outer surface of the body 51 to define an annular flange or rim 58 projecting slightly axially from the recessed top surface 57. Extending through the body 51 at equiangularly spaced-apart locations are four internally threaded bores 59 substantially parallel to the central axis of the body 51.

In assembly, referring to FIG. 5, the mounting apparatus 25 may first be assembled, with the support ring 50 being stacked upon the mounting ring 30 so that the top surface 57 of the support ring 50 engages the bottom surface 34 of the mounting ring 30, with the flange 58 of the support ring 50 seated against the step shoulder 35 of the mounting ring 30, as can best be seen in FIG. 2. The parts are arranged so that the bores 36 of the mounting ring 30 are respectively coaxially aligned with the bores 59 of the support ring 50. The aligned bores respectively receive screws 48 which are threadedly engaged in the internally threaded bores 59 of the support ring 50 for securing the mounting ring 30 to the support ring 50, the screw heads 49 being respectively received in the counterbores 37.

The mounting apparatus 25 may then be fitted down over the upper end of the vibration structure 11 (or the vibration structure fitted upwardly into the mounting apparatus 25), until the stop surface 44 of the mounting ring 30 abuts the end surface 22 of the mounting flange 20. The parts are so dimensioned that the cylindrical bearing surface 21 of the flange 20 is coaxially received within the cylindrical mounting surface 43 of the mounting ring 30 in press-fitted, coaxial bearing engagement therewith so as to inhibit relative movement therebetween. It will be appreciated that the stop surface 44 serves not only to axially position the parts, but also ensures that the mounting ring 30 is disposed coaxially with the vibration structure 11, preventing any tilting of the parts relative to one another. The inner cylindrical surface 41 of the mounting ring 30 will then be spaced slightly from the vibration structure 11. The cylindrical mounting surface 43 of the mounting ring 30 may have an axial extent substantially greater than that of the cylindrical bearing surface 21 of the mounting flange 20. This also serves to facilitate assembly and minimize the chance of non-coaxial alignment of the parts. The support ring 50 may then be fixedly secured to a suitable fixed support or mount (not shown) in the known manner.

Alternatively, the mounting apparatus 25 may be secured to the associated support before insertion of the vibration structure 11 upwardly thereinto. Also, the mounting ring 30 may be assembled with the vibration structure 11 prior to attachment of the mounting ring 30 to the support ring 50.

It will be appreciated that the relatively thin construction of the cantilevered flexural portion 40 of the mounting ring 30, as well as its disposition substantially parallel to the longitudinal axis of the vibration structure 11, permits a slight radial flexing of the flexural portion 40 to accommodate radial movements of the mounting flange 20. Preferably, the mounting flange 20 is disposed at a nodal location on the vibration structure 11 for the natural resonant frequency for which the vibration structure 11 is designed, antinodal regions typically being disposed at the locations of the end surfaces 16 and 18, all in a known manner. Because of the nodal location of the mounting flange 20, it will undergo substantially only radial movements at resonance, which can readily be accommodated by the cantilevered flexural portion 40, while those movements are substantially isolated from the associated rigid support.

It is an important aspect of the mounting apparatus 25 that the mounting ring 30 and, in particular, the cantilevered flexural portion 40 thereof, is tuned to be resonant at the natural resonant frequency of the vibratory system 10 which may, for example, be 20 khz or 40 khz. The resonance is achieved by material selection, geometry and dimensional parameters. Proper tuning may be achieved by selecting the axial length of the cantilevered flexural portion 40, and is greatly facilitated by the semicylindrical recesses 46. The recesses 46 are useful, not only for tuning, but also for mode refinement. In particular, these recesses allow hoop mode vibration to function near the vibration structure 11, but allow that mode to be decoupled near the rigid annular support ring 50. They also serve to reduce stress so that the flexural mode of vibration can function efficiently. The recesses 46 have a significant effect on the natural resonant frequency of the cantilevered flexural portion 40, so as to function essentially as a virtual tuning tool to refine the efficiency of the mount. It has been found that, without these recesses, efficiency is greatly reduced.

Figure 6A:
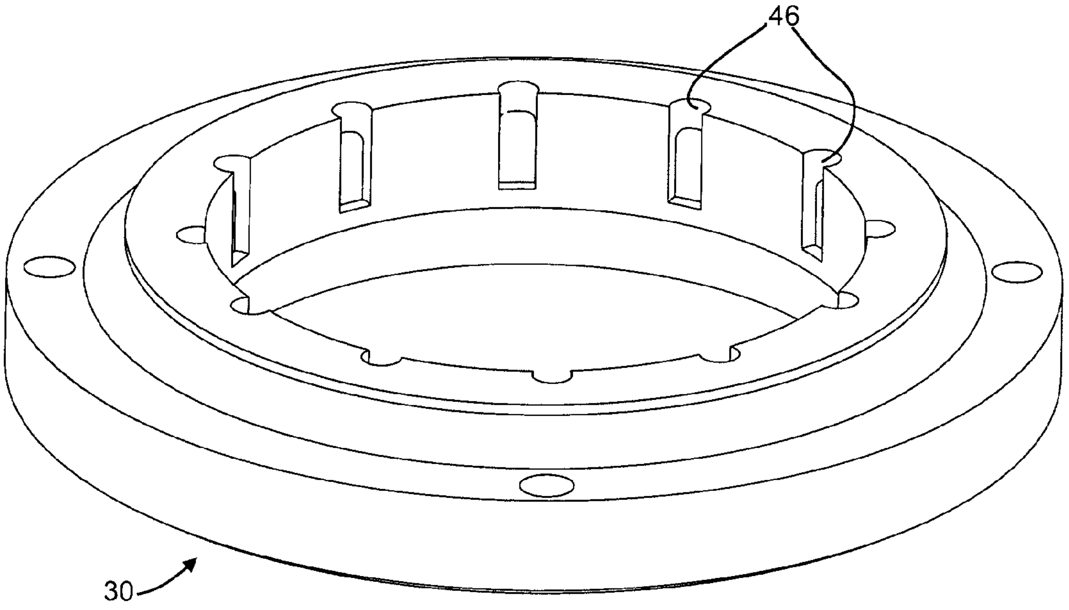
FIG. 6A is a perspective view of the mounting ring system of FIG. 1.
Figure 6B:
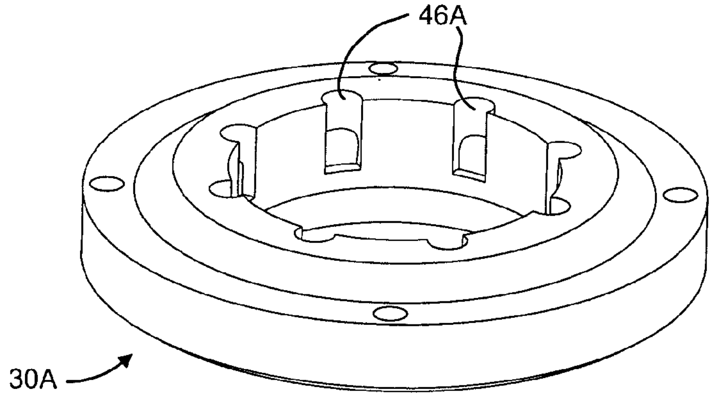
FIG. 6B is a view similar to FIG. 6A of a mounting ring designed for a different operating frequency.

The actual physical dimensions of the mounting ring 30 and the support ring 50 will depend upon the operating frequency of the vibratory system 10. Referring to FIGS. 6A and 6B, there are illustrated mounting rings 30 and 30A, respectively designed for use in 20 kHz and 40 kHz ultrasonic systems. It can be seen that the ring 30A is about half the size of the ring 30 and has tuning recesses 46A which may have the same size and shape as the tuning recesses 46, but which may be fewer in number.

While the mounting apparatus 25 functions extremely well, it does require that the mounting flange 20 be disposed substantially at a nodal region of the vibration structure 11 for efficient operation and effective vibration isolation. However, with certain vibration structures there is an amplitude gain from the input end to the output end which tends to shift the nodal region of the structure. Thus, in order to effectively use the mounting apparatus 25, it might be necessary to change the position of the mounting flange 20, thereby effectively requiring custom vibration structures.

Figure 9:
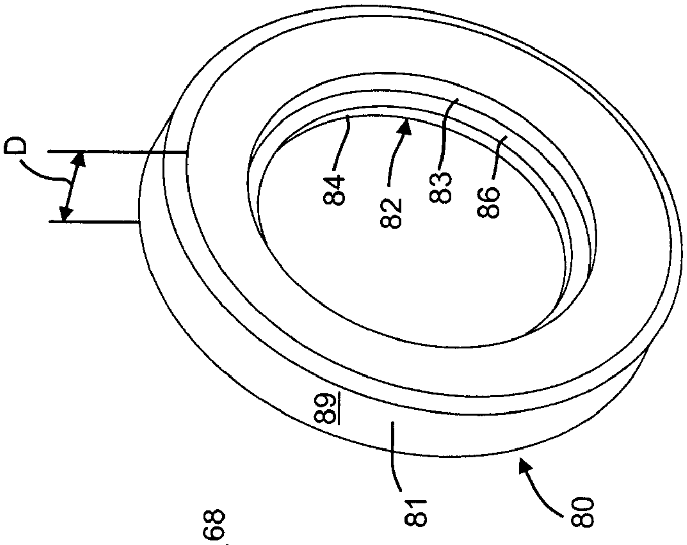
FIG. 9 is a perspective view of the mounting apparatus of FIG. 7, illustrating a tuning dimension.
Figure 7:
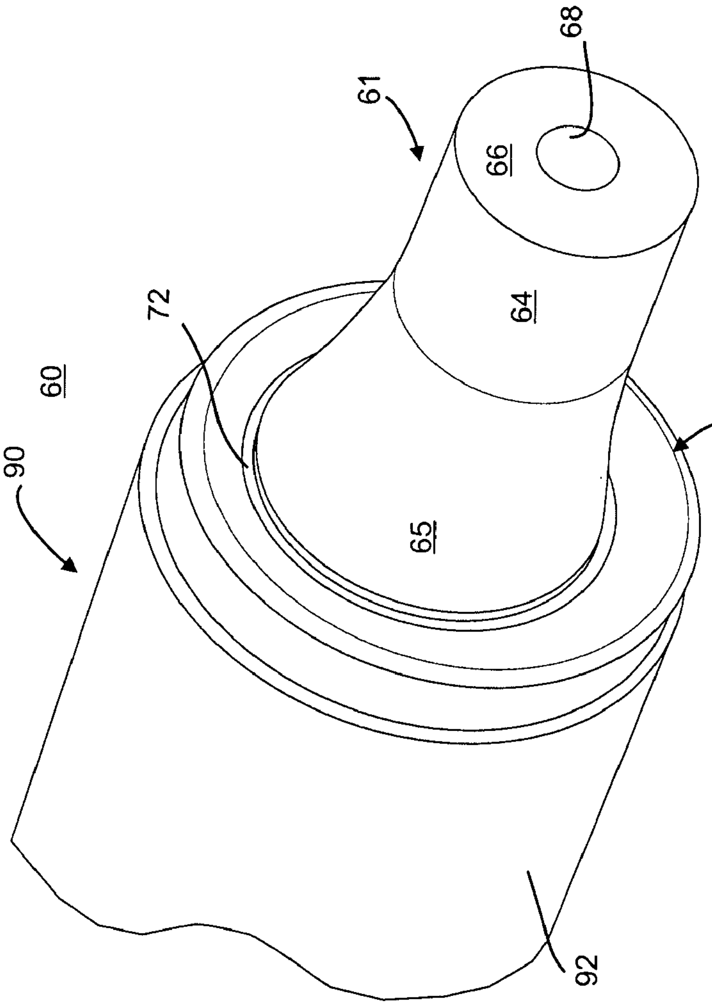
FIG. 7 is a fragmentary perspective view of another vibratory system using another embodiment of mounting apparatus.
Figure 8:
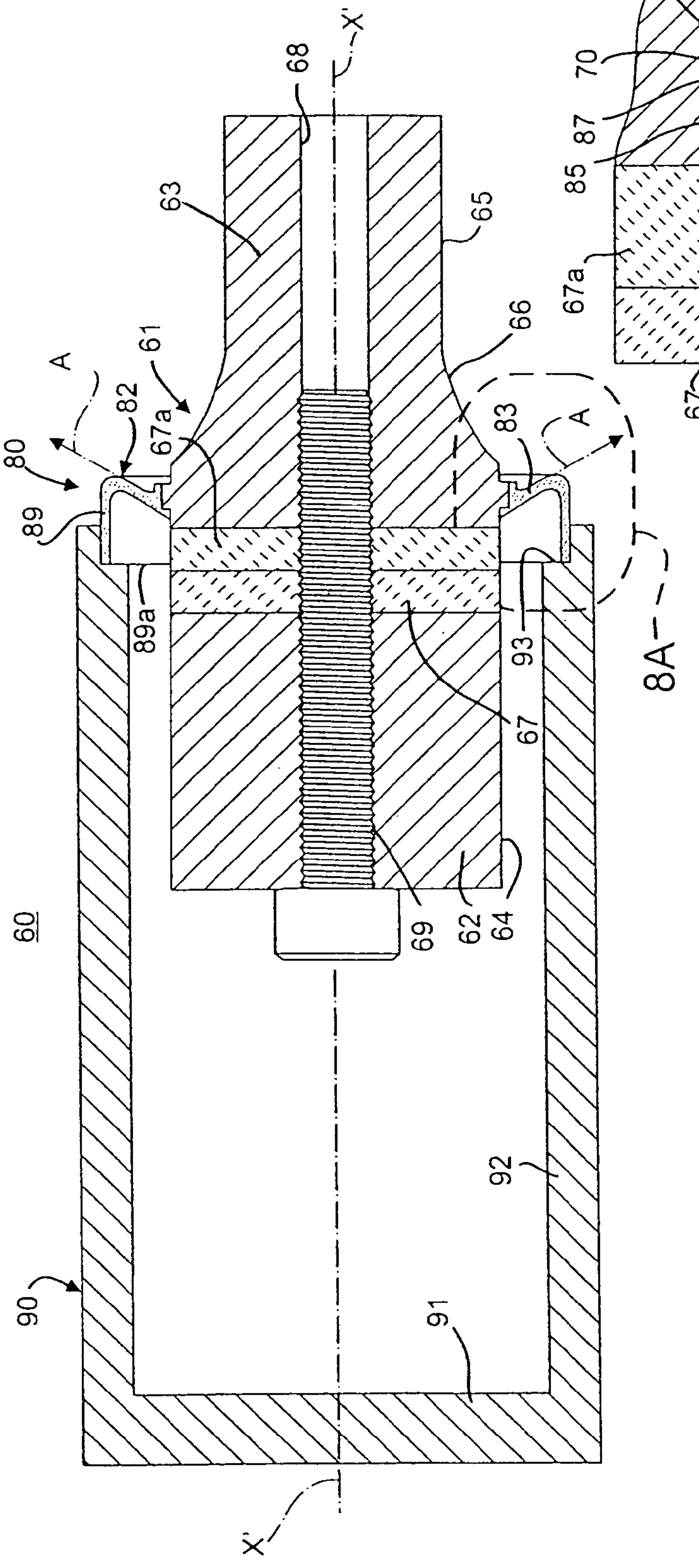
FIG. 8 is an enlarged longitudinal sectional view of a vibratory system of FIG. 7.

Referring to FIGS. 7–9, there is illustrated a vibratory system 60 including a vibration structure 61 and an alternative embodiment of mounting ring 80 for mounting the vibration structure 61 on an associated support 90. In the illustrated embodiment, the vibration structure 61 may be a probe or transducer assembly having a back slug or mass 62 and a front slug or mass 63. The rear slug 62 and the rear end of the front slug 63 have equal relatively large-diameter cylindrical surfaces 64. The front end of the front slug 63 has a reduced-diameter cylindrical surface 65, joined to the surface 64 of the slug 63 by a tapered portion 66. Two piezoceramic transducers (PZT's) 67 and 67*a* are sandwiched between the slugs 62 and 63 and have the same outer diameter as the surfaces 64. An axial bore 68 extends through the slugs 62 and 63 and the PZT's 67 and 67*a* and may have an internally threaded portion for threaded engagement with a screw 69 to clamp together the parts of the vibration structure 61 to form a transducer having a longitudinal axis X'.

Integral with the rear end of the front slug 63 and projecting radially outwardly from its surface 64 is an annular mounting flange 70, which may be substantially rectangular in transverse cross-section. The flange 70 has a substantially cylindrical outer bearing surface 71 which is substantially coaxial with the outer surface 64 and disposed at a predetermined radius from the axis X', and terminates at annular end surfaces 72 and 73 which are substantially parallel to each other and perpendicular to the axis X'. The mounting flange 70 may be disposed substantially at a nodal region of the vibration structure 61 at the natural resonant frequency thereof, but it need not be. It will be assumed that, in the illustrated embodiment, the mounting flange 70 is disposed at a non-nodal region so that, at resonance, it will undergo vibrational deflections in a direction inclined at a predetermined non-zero acute angle to the longitudinal axis X', so that the movement has both axial and radial components.

Figure 8A:
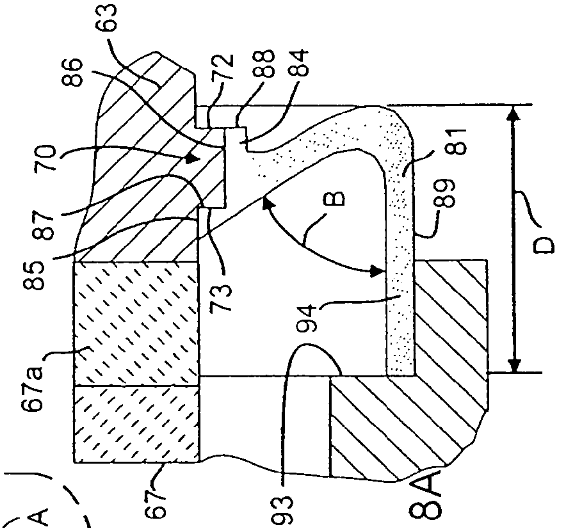
FIG. 8A is a further enlarged, fragmentary view of the portion designated 8A in FIG. 8.

Referring in particular to FIG. 8A, the mounting ring 80 has an outer cylindrical wall or body 81 unitary at one end thereof with a cantilevered flexural portion 82, which includes an inclined wall 83 disposed at a predetermined angle B to the outer cylindrical wall 81. Integral with the inclined wall 83 at the distal end thereof and projecting therefrom in a direction substantially opposite the outer cylindrical wall 81 is a cylindrical flange 84 which has a substantially cylindrical inner surface 85, which may have a diameter slightly greater than that of the outer surfaces 64 of the vibration structure 61. The inner surface 85 is counterbored at the forward end thereof to define a cylindrical mounting surface 86, which has a diameter substantially the same as that of the bearing surface 71 of the vibration structure flange 70, and an annular stop surface 87. The flange 84 terminates at a distal end 88, which may be spaced from the stop surface 87 an axial distance substantially equal to the axial extent of the cylindrical bearing surface 71 of the vibration structure flange 70. The outer cylindrical wall 81 defines an outer attachment surface 89 which is substantially coaxial with the mounting surface 86, the cylindrical wall 81 terminating at an annular distal end surface 89*a.*

The support 90 may be generally cup-shaped, having a circular end wall 91 integral around the periphery thereof with an elongated cylindrical wall 92. The inner surface of the cylindrical wall 92 is counterbored at its distal end to define an annular stop surface 93 and a cylindrical bearing surface 94, which has a diameter substantially the same as that of the attachment surface 89 of the mounting ring 80.

In assembly, the mounting ring 80 is assembled to the vibration structure 61 by inserting the front slug 63 through the ring 80 until the end surface 73 of the flange 70 abuts the stop surface 87 on the mounting ring flange 84, the parts being so dimensioned that the flange bearing surface 71 is disposable in press-fitted coaxial bearing engagement with the mounting surface 86 of the mounting ring 80 to inhibit relative movement therebetween, as can best be seen in FIG. 8. Again, the stop surface 87 on the ring 80 serves to axially position the parts and prevent tilting of vibration structure 61 relative to the ring 80 so that they remain substantially coaxial.

Next, the mounting ring 80 may be assembled to the support 90 by press-fitting the attachment surface 89 inside the cylindrical bearing surface 94 of the support 90 in coaxial bearing engagement therewith until the distal end surface 89*a* of the ring 80 abuts the annular stop surface 93 of the support 90, the stop surface 93 again ensuring that the assembled parts are coaxial.

The mounting ring 80 is preferably so designed that angle B is such that, when the parts are assembled in the manner illustrated in FIG. 8, the cantilevered flexural portion 82 and, in particular, the inclined wall 83 thereof, extends substantially in the direction indicated by the arrows A, which is substantially perpendicular to the direction of vibratory movement of the mounting flange 70 and can accommodate flexural movement in that direction. It will be appreciated that the angle B could be changed for different locations of the flange 70 relative to the nodal point of the vibration structure 61 at the resonant frequency. However, a specific angle B, such as that illustrated, has been found to work acceptably for a range of slightly different flange positions relative to the nodal point.

Another aspect of the vibratory system 60 is that the mounting ring 80 is designed to be resonant at the natural resonance frequency of the vibration structure 61. This resonance may be controlled by varying the length D (see FIGS. 8A and 9) of the outer cylindrical wall 81, thereby varying the overall length of the mounting ring 80 along the outer cylindrical wall 81 and the inclined wall 83.

Preferably the mounting rings 30 and 80 and the support ring 50 are formed of suitable metal materials, which afford sufficient rigidity to provide an effective mount while, at the same time, accommodating limited flexural movement. The actual material used may depend upon the resonant frequency of the system. In constructional models of the invention, the mounting ring 30 and support ring 50 have been formed of brass and the mounting ring 80 has been formed of brass or aluminum. However, it will be appreciated that other materials could be used, depending upon the operating frequencies involved.

While, in the illustrated embodiments, the mounting rings 30 and 80 have been assembled to the vibration structure by press-fitting, it would be possible to utilize other techniques, such as brazing, threaded coupling or the like. Also, while in the preferred arrangements, only a single mounting ring 30 or 80 is utilized to mount the vibration structure, it would be possible to use these mounting ring configurations in two-sided arrangements, utilizing two such mounting rings respectively applied to opposite sides of the mounting flange of the vibration structure.

While, in the illustrated embodiments, the mounting rings 30 and 80 are of unitary, one-piece construction, it will be appreciated that they could be formed of plural pieces integrally joined together.

From the foregoing, it can be seen that there has been provided an improved mounting arrangement for a vibration structure, which is of simple and economical construction, can be utilized without special tools or assembly equipment, is highly efficient and tunable to resonance at the resonant frequency of the vibration structure, and is usable with a variety of different types of vibration structures.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims, when viewed in their proper perspective based on the prior art.

What is claimed is:

1. Apparatus for mounting an elongated vibration structure which has a longitudinal axis and which undergoes axial vibrations and has a natural resonant frequency, the structure having a flange with an arcuate bearing surface disposed at a predetermined radius from the axis and with a radial flange end surface at an end of the bearing surface and extending radially inwardly therefrom, the apparatus comprising:

a mounting ring having a flexural portion defining an arcuate mounting surface terminating at a free distal flexural portion end surface, the flexural portion dimensioned to be disposed in a support position secured to the bearing surface of an associated vibration structure flange in coaxial bearing engagement therewith so as to inhibit relative movement therebetween, the flexural portion having a radial stop surface spaced from the flexural portion end surface for contacting the flange end surface when the flexural portion is disposed in the support position, the mounting ring having attachment structure attachable to an associated support, the flexural portion being shaped and dimensioned to be resonant at the resonant frequency and for flexing sufficient to accommodate movement of the bearing surface in response to resonance of the vibration structure.

2. The apparatus of claim 1, wherein the mounting ring is of unitary one-piece construction.

3. The apparatus of claim 1, wherein the mounting surface is substantially cylindrical in shape.

4. The apparatus of claim 1, wherein the mounting surface has an axial extent which is at least as great as the axial extent of the bearing surface.

5. The apparatus of claim 1, wherein the bearing surface is disposed at a nodal region of the vibration structure for the resonant frequency, the flexural portion being shaped and dimensioned for flexing radially sufficiently to accommodate radial movement of the bearing surface at resonance.

6. The apparatus of claim 1, wherein the bearing surface is disposed at a non-nodal region of the vibration structure for the resonant frequency, the flexural portion being shaped and dimensioned for flexing in directions inclined at a predetermined non-zero acute angle with respect to the axis.

7. The apparatus of claim 1, wherein the mounting surface is dimensioned for press-fitted engagement with the bearing surface.

8. The apparatus of claim 1, wherein the vibration structure is resonant at an ultrasonic frequency.

9. Apparatus for mounting an elongated vibration structure which has a natural resonant frequency, the apparatus comprising:

a mounting ring having a flexural portion defining an arcuate mounting surface, wherein the mounting ring also includes a body portion, the flexural portion being cantilevered from the body portion, the flexural portion having a plurality of circumferentially spaced and radially extending recesses formed therein, the mounting ring having attachment structure adapted for attachment to an associated support, the flexural portion being shaped and dimensioned to be resonant at the resonant frequency and for flexing sufficient to accommodate movement in response to resonance of the vibration structure.

10. The apparatus of claim 9 wherein the recesses are equiangularly spaced about the circumference of the flexural portion.

11. The apparatus of claim 9, wherein each of the recesses is substantially semicylindrical in shape.

12. The apparatus of claim 9, wherein each of the recesses extends radially through the flexural portion.

13. The apparatus of claim 9, wherein the recesses are spaced axially from the mounting surface.

14. The apparatus of claim 9, wherein the mounting ring is of unitary one-piece construction.

15. The apparatus of claim 9, wherein the mounting surface is substantially cylindrical in shape.

16. Apparatus for mounting an elongated vibration structure which has a natural resonant frequency the apparatus comprising:

a mounting ring having a flexural portion defining an arcuate mounting surface, wherein the mounting surface terminates at a free distal end, the flexural portion including a radial stop surface spaced from the free distal end, the flexural portion having a plurality of circumferentially spaced and radially extending recesses formed therein, the mounting ring having attachment structure adapted for attachment to an associated support, the flexural portion being shaped and dimensioned to be resonant at the resonant frequency and for flexing sufficient to accommodate movement in response to resonance of the vibration structure.

17. The apparatus of claim 16, and further comprising a support ring fixedly secured to the mounting ring.

18. Apparatus for mounting a vibration structure which has a natural resonant frequency, the apparatus comprising:

a mounting ring having a flexural portion defining an arcuate mounting surface radially spaced from a central axis, wherein the mounting surface terminates at a free distal end, the flexural portion including a radial stop surface spaced from the free distal end, the flexural portion having an inclined portion inclined at a predetermined non-zero acute angle to the axis, the mounting rind having attachment structure integral with the inclined portion and extending substantially parallel to the axis, the flexural portion being shaped and dimensioned to be resonant at the resonant frequency.

19. The apparatus of claim 18, wherein the mounting ring is of unitary one-piece construction.

20. The apparatus of claim 18, wherein the mounting surface is substantially cylindrical in shape.

21. The apparatus of claim 18, wherein the attachment structure includes a cylindrical attachment surface.

22. The apparatus of claim 21, wherein the attachment surface is disposed substantially coaxially with the mounting surface.

23. The apparatus of claim 18, wherein the mounting ring is formed of brass.

24. The apparatus of claim 18, wherein the mounting ring is formed of aluminum.

25. A method for mounting an elongated vibration structure which has a longitudinal axis and which undergoes axial vibrations and has a natural resonant frequency, the structure having a flange with an arcuate bearing surface disposed at a predetermined radius from the axis and with a radial flange end surface at an end of the bearing surface, the method comprising:

providing a mounting ring having a flexural portion defining an arcuate mounting surface terminating at a free distal flexural portion end surface and a radial stop surface spaced from the flexural portion end surface, the flexural portion being shaped and dimensioned to be resonant at the resonant frequency, disposing the flexural portion in a support position with the mounting surface in coaxial bearing engagement with the bearing surface of the vibration structure flange so as to inhibit relative movement therebetween and with the stop surface contacting the flange end surface, and attaching the mounting ring to an associated support.

26. The method of claim 25, wherein in the support position the bearing surface is disposed at a nodal region of the vibration structure for the resonant frequency.

27. The method of claim 25, wherein in the support position the bearing surface is disposed at a non-nodal region of the vibration structure for the resonant frequency.

28. The method of claim 25, wherein in the support position the mounting surface is press-fitted into engagement with the bearing surface.

29. The method of claim 25, wherein the attaching step includes fixedly securing an attachment ring to the mounting ring and attaching the attachment ring to the associated support.

30. The method of claim 29, wherein the mounting ring is press-fitted into engagement with the associated support.

* * * * *

UNITED STATES PATENT AND TRADEMARK OFFICE

CERTIFICATE OF CORRECTION

PATENT NO. : 6,984,921 B1
DATED : January 10, 2006
INVENTOR(S) : James A. Kosterman It is certified that error appears in the above-identified patent and that said Letters Patent is hereby corrected as shown below:

Column 9,
Line 28, “rind” should be -- ring --.

Signed and Sealed this

Thirteenth Day of June, 2006

JON W. DUDAS
*Director of the United States Patent and Trademark Office*